(12) United States Patent
Holub et al.

(10) Patent No.: US 9,984,429 B2
(45) Date of Patent: May 29, 2018

(54) FEATURE-BASED SIGNAL LOCALIZATION IN DIGITAL CAPTURE SYSTEMS

(71) Applicant: Digimarc Corporation, Beaverton, OR (US)

(72) Inventors: Vojtech Holub, Portland, OR (US); Tomas Filler, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days. days.

(21) Appl. No.: 15/374,370

(22) Filed: Dec. 9, 2016

(65) Prior Publication Data

US 2017/0091892 A1    Mar. 30, 2017

Related U.S. Application Data

(62) Division of application No. 14/332,739, filed on Jul. 16, 2014, now Pat. No. 9,521,291.

(Continued)

(51) Int. Cl.
*G06K 9/00*    (2006.01)
*G06T 1/00*    (2006.01)
(Continued)

(52) U.S. Cl.
CPC .............. *G06T 1/005* (2013.01); *G06K 9/66* (2013.01); *H04N 1/32197* (2013.01); *G06T 2201/0065* (2013.01); *G06T 2201/0601* (2013.01)

(58) Field of Classification Search
CPC ........... H04N 1/32197; H04N 1/32352; H04N 1/32154; G06T 2201/0601;
(Continued)

(56) References Cited

U.S. PATENT DOCUMENTS

| 5,859,920 A | 1/1999 | Daly et al. |
| 5,862,260 A | 1/1999 | Rhoads |

(Continued)

FOREIGN PATENT DOCUMENTS

| CN | 102254295 | 11/2011 |
| CN | 102592256 | 2/2015 |

(Continued)

OTHER PUBLICATIONS

U.S. Appl. No. 61/856,476, filed Jul. 19, 2013.

(Continued)

*Primary Examiner* — Shefali Goradia
(74) *Attorney, Agent, or Firm* — Digimarc Corporation

(57) ABSTRACT

The present disclosures relates generally to image signal processing and encoding signal within imagery. One claim recites a method comprising: obtaining data representing captured imagery, the captured imagery depicting packaging including digital watermarking, the digital watermarking including an orientation signal that is detectable in a transform domain; generating a n-dimensional feature set of the data representing captured imagery, the n-dimensional feature set representing the captured imagery in a spatial domain, where n is an integer great than 13; using a trained classifier to predict the presence of the orientation signal in a transform domain from the feature set in the spatial domain. Of course, other claims and combinations are provided too.

24 Claims, 5 Drawing Sheets

Related U.S. Application Data

(60) Provisional application No. 61/856,476, filed on Jul. 19, 2013, provisional application No. 61/918,214, filed on Dec. 19, 2013.

(51) Int. Cl.
   *G06K 9/66* (2006.01)
   *H04N 1/32* (2006.01)

(58) Field of Classification Search
   CPC ............ G06T 2201/0065; G06T 1/005; G06K 9/6276; G06K 9/66
   See application file for complete search history.

(56) References Cited

U.S. PATENT DOCUMENTS

| | | | |
|---|---|---|---|
| 5,949,885 | A | 9/1999 | Leighton |
| 6,094,509 | A * | 7/2000 | Zheng .................. G06K 7/1093 379/910 |
| 6,122,403 | A | 9/2000 | Rhoads |
| 6,175,627 | B1 | 1/2001 | Petrovic et al. |
| 6,208,735 | B1 | 3/2001 | Cox et al. |
| 6,345,104 | B1 | 2/2002 | Rhoads |
| 6,408,082 | B1 | 6/2002 | Rhoads et al. |
| 6,449,377 | B1 | 9/2002 | Rhoads |
| 6,590,996 | B1 | 7/2003 | Reed et al. |
| 6,614,914 | B1 | 9/2003 | Rhoads et al. |
| 6,687,385 | B1 | 2/2004 | Handley |
| 6,704,869 | B2 | 3/2004 | Rhoads et al. |
| 6,718,046 | B2 | 4/2004 | Reed et al. |
| 6,763,123 | B2 | 7/2004 | Reed et al. |
| 6,778,679 | B1 | 8/2004 | Handley |
| 6,891,959 | B2 | 5/2005 | Reed et al. |
| 6,912,295 | B2 | 6/2005 | Reed et al. |
| 6,947,571 | B1 | 9/2005 | Rhoads et al. |
| 7,013,021 | B2 | 3/2006 | Gustafson |
| 7,103,223 | B2 * | 9/2006 | Crill .................. G06F 17/30247 382/211 |
| 7,116,781 | B2 | 10/2006 | Rhoads |
| 7,130,442 | B2 | 10/2006 | Braudaway et al. |
| 7,657,058 | B2 | 2/2010 | Sharma |
| 7,738,709 | B2 | 6/2010 | Shi et al. |
| 8,224,017 | B2 | 7/2012 | Shi et al. |
| 8,243,980 | B2 | 8/2012 | Rhoads et al. |
| 8,281,138 | B2 | 10/2012 | Shi et al. |
| 8,457,414 | B2 | 6/2013 | Jahanbin et al. |
| 8,965,038 | B2 | 2/2015 | Liu |
| 9,521,291 | B2 | 12/2016 | Holub et al. |
| 2004/0221062 | A1 | 11/2004 | Starbuck |
| 2007/0177791 | A1 | 8/2007 | Shi et al. |
| 2008/0175429 | A1 | 7/2008 | Shi et al. |
| 2010/0037059 | A1 | 2/2010 | Sun et al. |
| 2011/0222760 | A1 | 9/2011 | Shi et al. |
| 2012/0284339 | A1 | 11/2012 | Rodriguez |
| 2013/0182972 | A1 | 7/2013 | Jing et al. |
| 2013/0223673 | A1 | 8/2013 | Davis et al. |
| 2014/0112524 | A1 | 4/2014 | Bai et al. |
| 2014/0142958 | A1 | 5/2014 | Sharma et al. |
| 2014/0282664 | A1 | 9/2014 | Lee |
| 2014/0324833 | A1 | 10/2014 | Davis et al. |

FOREIGN PATENT DOCUMENTS

| | | |
|---|---|---|
| CN | 104680473 | 6/2015 |
| CN | 104778702 | 7/2015 |
| WO | WO/2013/033442 | 3/2013 |

OTHER PUBLICATIONS

U.S. Appl. No. 61/918,214, filed Dec. 19, 2013.

Avcibas, et al., "Steganalysis of Watermarking Techniques Using Images Quality Metrics", Proceedings of SPIE, Jan. 2001, vol. 4314, pp. 523-531.

Dautzenberg, "Watermarking Images," Department of Microelectronics and Electrical Engineering, Trinity College Dublin, 47 pages, Oct. 1994.

Hernandez et al., "Statistical Analysis of Watermarking Schemes for Copyright Protection of Images," Proceedings of the IEEE, vol. 87, No. 7, Jul. 1999.

Holub & Fridrich, "Digital image steganography using universal distortion," IH&MMSec '13 Proceedings of the first ACM workshop on Information hiding and multimedia security, pp. 59-68 (2013).

Kodovsk, Fridrich & Holub, "On dangers of overtraining steganography to incomplete cover model," MM&Sec '11 Proceedings of the thirteenth ACM multimedia workshop on Multimedia and security, pp. 69-76 (2011).

Fridrich, Kodovsk . & Holub, "Steganalysis of Content-Adaptive Steganography in Spatial Domain," Information Hiding, vol. 6958 of the series Lecture Notes in Computer Science pp. 102-117, 2011.

J. Fridrich and J. Kodovsk . "Rich models for steganalysis of digital images," IEEE Trans. on Information Forensics and Security, 7(3):868-882, Jun. 2012.

J. Kodovsk, J. Fridrich, and V. Holub, "Ensemble classifiers for steganalysis of digital media," IEEE Trans. on Inform. Forensics and Security, 7(2):432-444, Apr. 2012.

Pevn, P. Bas, and J. Fridrich, "Steganalysis by subtractive pixel adjacency matrix," IEEE Transactions on Information Forensics and Security, 5(2):215-224, Jun. 2010.

O'Ruanaidh, "Rotation, Scale and Translation Invariant Digital Image Watermarking," Signal Processing, pp. 2-15, May 1, 1998.

S. Pereira, J. J. K. Oruanaidh, F. Deguillaume, G. Csurka and T. Pun, Template Based Recovery of Fourier-Based Watermarks Using Log-polar and Log-log Maps, in Int. Conference on Multimedia Computing and Systems Jun. 1999.

R. O. Duda, P. E. Hart, and D. G. Stork, "Pattern Classification." Wiley Interscience, 2nd edition, 2000.

Chin-Chung Chang and Chih-Jen Lin,, "LIBSVM: A Library for Support Vector Machines," ACM Transactions on Intelligent Systems and Technology, vol. 2, No. 3, Article 27, Publication date: Apr. 2011.

Fan, et al., "LIBLINEAR: A Library for Large Linear Classification," Journal of Machine Learning Research 9 (2008) 1871-1874.

Machine Translation from EPO Patent Translate of CN102254295A (abstract, description and claims), machine translated on Aug. 30, 2016, 13 pages.

Machine Translation from EPO Patent Translate of CN102592256A (abstract, description and claims), machine translated on Aug. 30, 2016, 16 pages.

Machine Translation from EPO Patent Translate of CN104680473A (abstract, description and claims), machine translated on Aug. 30, 2016, 16 pages.

Machine Translation from EPO Patent Translate of CN104778702A (abstract, description and claims), machine translated on Aug. 30, 2016, 11 pages.

Sullivan et al., "Steganalysis of Spread Spectrum Data Hiding Exploiting Cover Memory", SPIE2005, vol. 5681, pp. 38-46.

Lyu et al., "Detecting Hidden Messages Using Higher-Order Statistics and Support Vector Machines," 5th International Workshop on Information Hiding, Noordwijkerhout, The Netherlands, 2002.

Fridrich et al., "Steganalysis of JPEG Images: Breaking the F5 algorithm", 5th Information Hiding Workshop, 2002, pp. 310-323.

Justus et al., "Performance Study of Specific and Universal Image Steganalysis Techniques," International Conference on Computing, Communication and Information Technology (ICCCIT 2012), Jun. 27-29, 2012.

\* cited by examiner

Table 1

| | $P_{FA} (P_{MD} = 1\%)$ | $P_{FA} (P_{MD} = 0.5\%)$ | $P_{FA} (P_{MD} = 0.1\%)$ |
|---|---|---|---|
| Watermarked objects | 28.73% | 31.90% | 40.03% |
| Non-watermarked objects | 4.46% | 5.93% | 14.7% |

FEATURE-BASED SIGNAL LOCALIZATION IN DIGITAL CAPTURE SYSTEMS

RELATED APPLICATIONS

This application is a division of U.S. patent application Ser. No. 14/332,739 (now U.S. Pat. No. 9,521,291), which claims the benefit of U.S. Provisional Patent Application Nos. 61/856,476, filed Jul. 19, 2013, and 61/918,214, filed Dec. 19, 2013, which are each hereby incorporated herein by reference.

TECHNICAL FIELD

The disclosure relates generally to product packaging, image capture, signal processing, steganographic data hiding and digital watermarking.

DETAILED DESCRIPTION

Figure 1:
FIG. 1 shows portions of frames captured by a monochromatic camera.

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals. Watermarking can be incorporated into images or graphics that are then printed, e.g., on product packaging.

Digital watermarking systems may include two primary components: an embedding component that embeds a watermark in media content, and a reading component that detects and reads an embedded watermark (referred to as a "watermark reader," or "watermark decoder," or simply as a "reader" or "decoder"). The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") may analyze target content to detect whether a watermark is present. In applications where the watermark encodes information (e.g., a message or auxiliary payload), the reader may extract this information from a detected watermark.

A watermark embedding process may convert a message, signal or payload into a watermark signal. The embedding process may then combine the watermark signal with media content and possibly other signals (e.g., a transform domain-based orientation pattern or synchronization signal) to create watermarked media content. The process of combining the watermark signal with the media content may be a linear or non-linear function. The watermark signal may be applied by modulating or altering signal samples in a spatial, temporal or transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 7,013,021; 6,947,571; 6,912,295; 6,891,959. 6,763, 123; 6,718,046; 6,614,914; 6,590,996; 6,408,082; 6,122,403 and 5,862,260, and in published specifications WO 9953428 and WO 0007356 (corresponding to U.S. Pat. Nos. 6,449, 377 and 6,345,104). Some 3rd-party work is reflected in, e.g., U.S. Pat. Nos. 7,130,442; 6,208,735; 6,175,627; 5,949, 885; 5,859,920. Each of the patent documents identified in this paragraph is hereby incorporated by reference herein in its entirety. Of course, a great many other approaches are familiar to those skilled in the art, e.g., Avcibas, et al., "Steganalysis of Watermarking Techniques Using Images Quality Metrics", Proceedings of SPIE, January 2001, vol. 4314, pp. 523-531; Dautzenberg, "Watermarking Images," Department of Microelectronics and Electrical Engineering, Trinity College Dublin, 47 pages, October 1994; Hernandez et al., "Statistical Analysis of Watermarking Schemes for Copyright Protection of Images," Proceedings of the IEEE, vol. 87, No. 7, July 1999; J. Fridrich and J. Kodovsk. Rich models for steganalysis of digital images, IEEE Transactions on Information Forensics and Security, 7(3):868-882, June 2011; J. Kodovsk, J. Fridrich, and V. Holub. Ensemble classifiers for steganalysis of digital media, IEEE Transactions on Information Forensics and Security, 7(2):432-444, 2012; and T. Pevn, P. Bas, and J. Fridrich. Steganalysis by subtractive pixel adjacency matrix, IEEE Transactions on Information Forensics and Security, 5(2):215-224, June 2010; I. J. Cox, M. L. Miller, J. A. Bloom, J. Fridrich, and T. Kalker. Digital Watermarking and Steganography, Morgan Kaufman Publishers Inc., San Francisco, Calif., 2007; R. O. Duda, P. E. Hart, and D. H. Stork. Pattern Classification. Wiley Interscience, New York, 2nd edition, 2000; each of which is hereby incorporated herein by reference in its entirety. The artisan is presumed to be familiar with a full range of literature concerning steganography, data hiding and digital watermarking.

Digital watermarking may be used to embed an auxiliary payload into cover media (e.g., images, packaging, graphics, etc.) such that changes to the cover media to convey the digital watermarking remain invisible to humans but allows machines to reliably extract the auxiliary payload even after common signal-processing operations (e.g., noise, filtering, blurring, optical capture). This allows machines to uniquely identify objects they see or hear. Digital watermarking has been used for applications including media content protection, track and trace, etc.

Among other applications, this disclosure addresses an application where digital watermarks are included in consumer packaging (e.g., a soup labels, cereal boxes, etc.). The digital watermark can include information like UPC information, product information, distribution information, retail channel information, and/or an index to such information. Because a large surface area of a package can be watermarked, users no longer need to search for barcode at checkout, thus leading to overall speedup of the checkout process. Assignee's patent application Ser. No. 13/750,752 (published as US 2013-0223673 A1), filed Jan. 25, 2013 and Ser. No. 13/804,413, filed Mar. 14, 2013 (published as US 2014-0112524 A1), and published PCT application No. WO/2013/033442, which is each hereby incorporated herein by reference in its entirety, discusses related use scenarios. Such retail checkout scenarios are improved when digital watermarking can be located and decoded in a timely manner as watermarked packaging is swiped or moved in front of an optical scanner (or camera). Assuming a fixed or limited time budget allocated for each image frame, limited image frame areas can be examined with a watermark reader to optimize detection time. Due to such constraints, a watermark reader can be configured as a chain of modules, each providing low missed-detection rate information and decreasing false alarms so that un-watermarked image areas can be rejected as early as possible while reducing missing of watermarked area.

One aspect of this disclosure is a pre-watermark detection analysis that quickly analyzes image data and rejects areas that most likely do not contain watermarking. This pre-watermark detection analysis can quickly analyze each area (or subsets of areas) of captured image frames and classify the areas as being watermarked or not. This analysis is preferably less computationally expensive compared to a full watermark read attempt. One technique focuses on image features constructed in the spatial domain to predict whether a transform-domain based digital watermark signal is likely included therein. Preferably, the watermark detector can recognize watermarked areas independent of rotation, scale and pose.

Image areas can be converted into statistical features, e.g., the '1a) spam14h,v' (FIG. 2) in the J. Fridrich et al., "Rich models for steganalysis of digital images," IEEE Transactions on Information Forensics and Security, 7(3):868-882, June 2011 ("Fridrich"), which is hereby incorporated by reference. A very small portion (including portions of section II, C) from the Fridrich paper is provided below:

Co-Occurrence Symmetrization

The individual submodels of the rich image model will be obtained from the 78 co-occurrence matrices computed above by leveraging symmetries of natural images. The symmetries are in fact quite important as they allow us to increase the statistical robustness of the model while decreasing its dimensionality making it thus more compact and improving the performance-to-dimensionality ratio. We use the sign-symmetry[2] well as the directional symmetry of images. The symmetrization depends on

[2] Sign-symmetry means that taking a negative of an image does not change its statistical properties. the residual type. All 'spam' residuals are symmetrized sequentially by applying the following two rules for $d=(d_1, d_2, d_3, d_4) \in T_4$:

$$\overline{C}_d \leftarrow C_d + C_{-d}, \quad (5)$$

$$\overline{C}_d \leftarrow \overline{C}_d + \overline{C}_{\overleftarrow{d}}, \quad (6)$$

where $\overleftarrow{d} = (d_4, d_3, d_2, d_1)$ and $-d = (-d_1, -d_2, -d_3, -d_4)$.

After eliminating duplicates from $\overline{C}$ (which had originally 625 elements), only 169 unique elements remain.

For our purposes, the parameters we chose are quantization step q=3, truncation threshold T=2 and co-occurrence order D=4. An analyzed image frame is first resized, e.g., using bilinear interpolation to 25% of its original size (1/16 of the original pixels) in order reduce noise, speed up the feature extraction process and to model longer range dependencies. For example, when considering dependencies, image pixel values or residual values are not typically independent, e.g., two neighboring pixels have a likelihood of having the same or nearly the same value. On the other hand, if you take two pixels from opposite side of an image block, the pixels will most likely be very different. Even though the dependencies are weakening with range, there are still some. Being able to utilize (model) these longer range dependencies gives some extra information we can utilize. For example, if you can create a good model of five neighboring pixels it will be better for us than a good model of only two neighboring pixels.

To describe this feature set, we use the symbol X for an M×N grayscale image whose pixel values, $x_{i,j} \in \{0, 1, \ldots, 255\}$, are represented using the matrix $(x_{i,j})$, i=1, ..., M, j=1, ..., N. The horizontal noise residual $Z=(Z_{i,j})$ is computed as $z_{i,j} = x_{i,j} - x_{i,j+1}$. The traditional approach now continues with quantization, rounding and truncation of $Z_{i,j}$, $$r_{i,j} = trunc_T\left(\text{round}\left(\frac{z_{i,j}}{q}\right)\right) \quad (1)$$

and forming a D-dimensional co-occurrence matrix $C = (c_{d_1, \ldots, d_D})$, $d_i \in \{-T, \ldots, T\}$ from D horizontal neighboring values of $r_{i,j}$. The process is then repeated with transpose of the image X to obtain statistics from the vertically neighboring pixels. Both horizontal and vertical co-occurrences are averaged together. By exploiting symmetries in natural images we can reduce the dimensionality by adding up values in co-occurrence bins $c_{d_1, \ldots, d_D}$, $c_{d_D, \ldots, d_1}$, $c_{-d_1, \ldots, -d_D}$, $c_{-d_D, \ldots, -d_1}$ to obtain the final 169-dimensional feature set.

In order to minimize detection time, e.g., without a conversion of all image data into a transform domain, this feature set characterizes spatial domain image properties. In a case where an embedded watermark signal includes detectable transform domain features (e.g., an orientation signal detectable in the transform domain), we are using the spatial domain feature set to predict the presence of the transform domain orientation signal.

The formulation of the watermark localization problem leads to a binary classification problem to decide whether the feature vector is extracted from an image containing a readable watermark or not. Machine learning is preferably utilized to train a binary classifier on a large amount of labeled training samples so that it can well generalize and successfully classify previously unseen samples. The training establishes a boundary between watermarked and non-watermarked image blocks to enable a pre-watermark analysis module to make fast, accurate decisions.

There are many known classifiers, e.g., Linear Support Vector Machines (L-SVM), Gaussian kernel SVM (G-SVM) and Fisher Linear Discriminant (FLD). Results discussed in this disclosure were obtained using FLD, which exhibited fast classification and simple implementation of Neyman-Pearson Criterion under fixed missed detection rates, but other classifiers could be used in the alternative.

A monochromatic camera with red illumination providing, e.g., 40 1024×1280-pixel frames per second, can be used to obtain image data. Of course other cameras can be used instead. A pre-watermark analysis module obtains image blocks, e.g., 384×384 pixels each, from pre-determined partially overlapping positions (e.g., 2-8 positions).

FIG. 1 shows portions of frames as captured by the monochromatic camera. While the watermark on the tomato soup label (left in FIG. 1) can be seen by some (e.g., grainy texture), it is not possible to read it because of the extreme angle and the shape of the can. The coffee cup (middle in FIG. 1), on the other hand, is not watermarked but the way the air bubbles are arranged may cause a false detection (e.g., False Positive). FIG. 1 (at right image) also shows strong AWGN (additive white Gaussian noise) component cropped from an image with no object present the noise variance is 18.5 and the PSNR is 35.5 dB.

To test the pre-watermark detector module, we acquired around 30,000 images of 20 watermarked test packages (e.g., cans, boxes, bags, etc.) and 10,000 images with non-watermarked objects. In a retail setting, with packages zooming by a checkout scanner or camera, approximately one third of the images captured by the scanner/camera contain pictures of noise and dark background (e.g., no packages present during image capture), so some of these were also included in the training set. Our example training set included approximately 5,000 cover and 5,000 watermarked randomly selected blocks identified by a watermark reader (in this case, a Digimarc Discover reader, provided by Digimarc Corporation, Beaverton, Oreg., USA). Half of the cover blocks were taken from an image database with watermarked objects that were present but cannot be read and half from the image database with the non-watermarked objects.

Most of the cover blocks containing just background were removed for this test.

Two testing sets are used in this example, 10,000 blocks from checkout swipes with watermarked objects and 10,000 blocks from checkout swipes with non-watermarked objects. All images in both sets are preferably completely excluded from the training phase in order to avoid overtraining.

Figure 3:
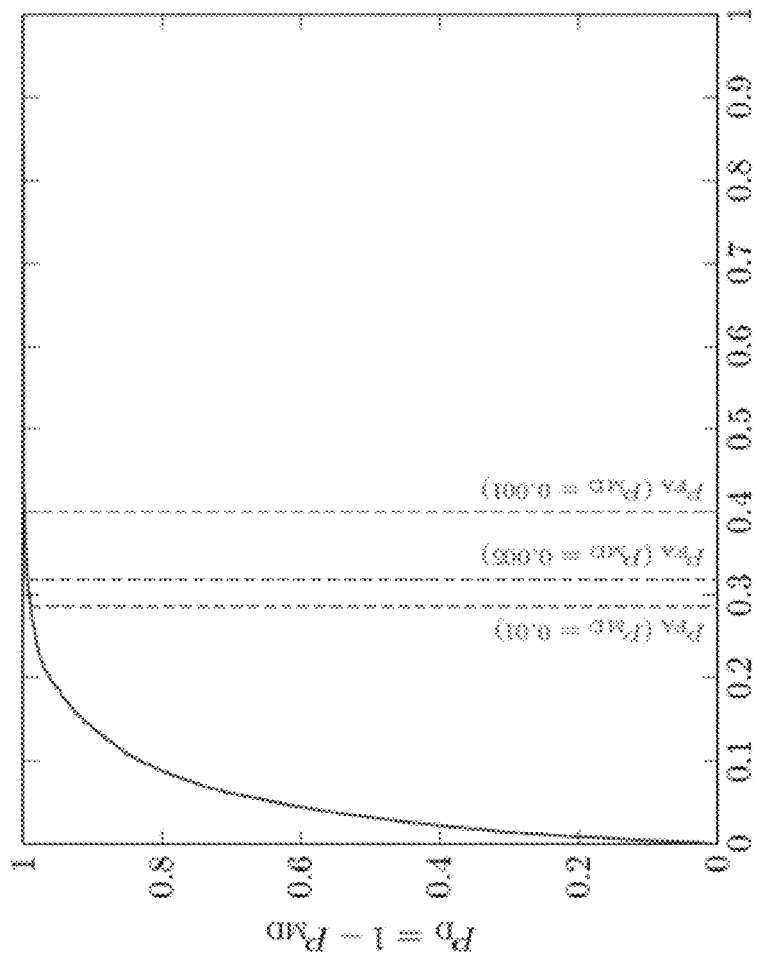
FIG. 3 shows a receiver operating characteristic curve of a proposed detector for blocks with watermarked objects.

A goal of the disclosed detector is to distinguish between watermarked and non-watermarked blocks for a low fixed missed-detection probability PMD. The results for the thresholds set to achieve PMD 2 {0.01, 0.005, 0.001} are shown in Table 1 and the receiver operating characteristic curve of a proposed detector for block with watermarked objects is plotted in FIG. 3.

Figure 2:
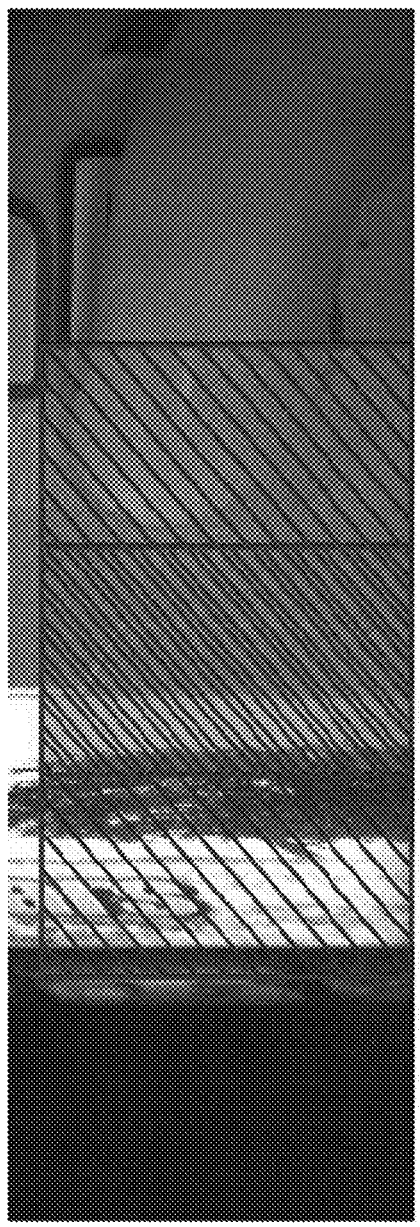
FIG. 2 shows a visual/graphical example of a watermark detection process, including strong detection areas.

A visual (graphical) example of a watermark detection process is shown in FIG. 2 relative to a product packaging. The two right-directional hashed marked boxes highlight the regions where watermarking can be read by a reader. The overlapping hatched areas mark box (middle) is the areas pinpointed by the detector for reading by the watermark reader. The two right most rectangle areas where positively read by a watermark reader, while the left most rectangle area was not.

Our tests shows that the proposed detector is able to reduce the number of images unnecessarily processed by the watermark reader by 60-95% depending on the image content and chosen missed-detection rate. Feature extraction and classification process is efficient to be implemented in software or as part of camera hardware providing the guidance to the detector in real-time.

In some cases a watermark reader outputs a successfully decoded auxiliary payload and a strength indication of a detected synchronization signal (e.g., orientation component). Instead of training a binary classifier that outputs only "watermarked" and "not watermarked," an alternative classifier is trained with a linear or non-linear regressor that would allow an estimate of detected orientation signal strength directly from the feature set (e.g., from the 169 features). Therefore, it would tell how well an image block is likely to be readable. The watermark reader can prioritize on the blocks with the highest "readability"—strongest estimated orientation strength.

Of course, the invention should not be limited by citing example block sizes, parameters, monochrome scanner, testing sets, etc. For example, a watermark reader can work with much smaller blocks than 384×384 and merge classifier decisions of neighboring blocks to achieve finer watermark localization.

Appendix A of this specification is hereby incorporated by reference. Appendix A provides additional description of, e.g., statistical learning-based methods for localizing watermarked areas corresponding to physical objects depicted in imagery taken by a digital camera (e.g., still or video). In one such example, noise sensitive features and linear classifiers (e.g., a logistic regressor) are used to estimate probabilities of digital watermark presence in some or all subcomponents of an image. These probabilities can then be used to pinpoint areas that are recommended for watermark detection. Preliminary testing shows that this approach is significantly faster than running a watermark detector for each corresponding subcomponent.

Feature-Based Watermark Localization in Digital Capture Systems

ABSTRACT: The "Internet of Things" is an appealing concept aiming to assign digital identity to both physical and digital everyday objects. One way of achieving this goal is to embed the identity in the object itself by using digital watermarking. In the case of printed physical objects, such as consumer packages, this identity can be later read from a digital image of the watermarked object taken by a camera. In many cases, the object might occupy only a small portion of the the image and an attempt to read the watermark payload from the whole image can lead to unnecessary processing. This paper proposes statistical learning-based algorithm for localizing watermarked physical objects taken by a digital camera. The algorithm is specifically designed and tested on watermarked consumer packages read by an of-the-shelf barcode imaging scanner. By employing a simple noise sensitive features borrowed from blind image steganalysis and a linear classifier (logistic regressor), we are able to estimate probabilities of watermark presence in every part of the image significantly faster than running a watermark detector. These probabilities are used to pinpoint areas that are recommended for further processing. We compare our adaptive approach with a system designed to read watermarks from a set of fixed locations and achieve significant saving in processing time while improving overall detector robustness.

1. Introduction

Digital watermarking is an art of embedding auxiliary payload into cover media such that the change remains invisible to humans but enables machines to reliably extract the payload even after common signal-processing operations. This allows machines to uniquely identify objects they see or hear. Such form of robust data hiding has been used extensively in the last two decades for applications including media content protection, track and trace, etc. See I. J. Cox, M. L. Miller, J. A. Bloom, J. Fridrich, and T. Kalker. Digital Watermarking and Steganography. Morgan Kaufman Publishers Inc., San Francisco, Calif., 2007.

We focus on application where watermarks are printed on consumer packages and carry information similar to one found in barcodes. Because most of the package surface can be watermarked, users no longer need to search for barcode at checkout, thus leading to overall speedup of the process. In this application, watermark has to be located and decoded as fast as possible while the package is swiped in front of the scanner. Assuming fixed time budget allocated for each frame, only limited area can be examined with algorithm designed to read the watermarks (watermark reader). Due to such constraint, watermark reading framework should be designed as a chain of modules, each providing low missed-detection rate and decreasing false alarms so that unmarked areas are rejected as early as possible while not missing any marked area.

Goal of this paper is to design the very first module in the watermark reading framework that quickly analyzes the image and pinpoints areas that most likely contain watermark. More precise watermark detection and decoding algorithms are then used to read the payload or reject the pinpointed area. We borrow the basic tools from the field of image steganalysis (see J. Fridrich and J. Kodovsk. Rich models for steganalysis of digital images. IEEE Transactions on Information Forensics and Security, 7(3):868-882, June 2011) and, for complexity reasons, deliberately constraint ourselves to image features constructed directly in spatial domain. Although the tools are available in the literature and have been used for years, they were not studied in the context of robust detection of noisy signals as in the paper.

For the purpose of this paper, we use a specific instance of watermark reader (spread-spectrum watermark detector compatible with Digimarc Discover) which we further treat as a black box. This detector uses 128×128 image block to detect presence of a watermark with high accuracy. Our goal is to develop an algorithm that will decide where in the captured image should the 128×128 block be placed. We do this by using a binary classifier (logistic regressor) learned to distinguish between image blocks with marked and unmarked content.

Figure 4C:
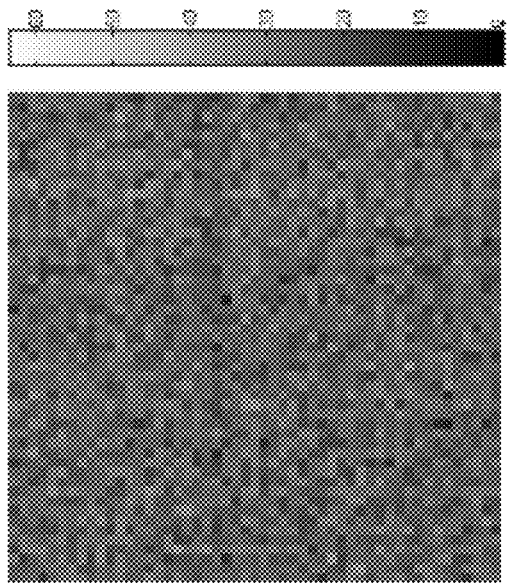
FIG. 4C shows detail of full resolution background noise.
Figure 4B:
FIG. 4B shows an unmarked air insulated coffee cup causing false alarms.
Figure 4A:
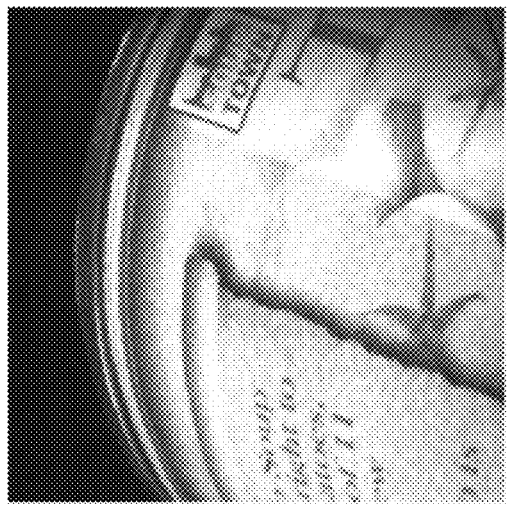
FIG. 4A shows a tomato soup can with unreadable watermark.

FIG. 4A shows a tomato soup can with unreadable watermark, FIG. 4B shows an unmarked air insulated coffee cup causing false alarms, and FIG. 4C shows detail of full resolution background noise.

To apply the trained classifier for watermark localization, an image is decomposed into much smaller square sub-blocks. Carefully chosen features are extracted from each sub-block and the trained logistic regressor is used to estimate the probability of watermark presence. The result of this process is a probability map of a given image. Finally an averaging kernel is applied on this probability map and the algorithm selects a number of locations with watermark probability exceeding a given threshold. These locations are taken as the centers of the blocks considered for further processing by a watermark reader.

Section 2 describes the experimental setup. Information about the feature set, its parameters selection and the classifier is in Section 3. The transition from binary classification problem to watermark localization is described in Section 4. Section 5 contains localization experiment results and justification for its parameter selection. Finally, brief summary can be found in Section 6.

2. Equipment and Common Setup

Images for all experiments described in this paper were acquired with commercially available imaging barcode scanner with monochromatic camera and red LED illumination. The front-facing camera from this scanner provides 40 1024×1280-pixel frames per second. Each frame captures an item from two different angles using two sets of mirrors causing the image to be split in half. Strobed LED illumination and fast exposure time effectively limit motion blur allowing the scanner to provide sharp images. Obtained images have a noise component with the PSNR of 35.5 dB as shown in FIG. 1. To train and test the proposed approach, we captured tens of thousand images simulating a checkouts process in a grocery store with various marked and unmarked objects. Some of the images contains pure image noise when no object is presented to the camera.

All results presented in this paper are from 341×426-pixel images obtained by downsampling the original images by a 3×3 box filter. The downsampling factor was empirically determined to provide the best robustness for the watermark detector at hand. Moreover, the downsampling also speeds up the overall watermark extraction, and suppresses the noise component.

3. Watermark Classification Framework

This section describes all components of the watermark classification framework. Next section describes how to apply this for watermark localization.

3.1 Feature Set

Key component of the proposed algorithm is noise sensitive feature set that provides enough statistical evidence to distinguish Digimarc Discover noise-like watermark from other noisy content. Since this problem is very similar to one in digital image steganalysis, we decided to use already developed features from that field. After experimenting with multiple feature sets used in steganalysis and their parameter settings, we decided to use one of the simplest sub-models described Spatial Rich Model[3] (SRM) paper. The authors of this paper introduce a set of 39 linear and non-linear high-pass filters to obtain rich representations of noise residuals. In order to fit into tight complexity constrains we select the simplest of SRM's feature sets—'1a) spam14h' from FIG. 2 in the SRM paper. The features are extracted from already downsampled image (⅑ of the original pixels). Using the same image scale for feature extraction and watermark detection speeds up the whole process, suppresses noise and allows to model longer range dependencies.

We use the symbol X for an M×N grayscale image whose pixel values, $x_{i,j} \in \{0, 1, \ldots, 255\}$, are represented using the matrix $X=(x_{i,j})$, $i=1, \ldots, M$, $j=1, \ldots, N$. The horizontal noise residual $Z=(z_{i,j})$ is computed as $z_{i,j}=x_{i,j}-x_{i,j+1}$. The traditional approach now continues with quantization, rounding and truncation of $z_y$, $$r_{i,j} = trunc_T\left(round\left(\frac{z_{i,j}}{q}\right)\right), trunc_T(k) \begin{cases} T & k \geq T \\ k & -T < k < T \\ -T & k \leq -T \end{cases} \quad (1)$$

and forming a D-dimensional co-occurrence matrix $C=(c_{d1}, \ldots, d_D)$, $d_i \in \{T, \ldots, T\}$ from D horizontal neighboring values of $r_{i,j}$. The process is then repeated with the transpose of the image X to obtain statistics from the vertically neighboring pixels. Both horizontal and vertical co-occurrences histogram bins are added together and normalized so that all bins sum up to one. The normalization is important for classification of images with different sizes. Finally, by exploiting symmetries in natural images the dimensionality can be reduced by adding up values in co-occurrence bins $c_{d1}, \ldots, d_D, c_{dD}, \ldots, d_1, c_{-d1}, \ldots, -dD, c_{-dD}, \ldots, -d_1$ to obtain the final 169-dimensional feature vector. More detailed explanation is available in J. Fridrich and J. Kodovský. Rich models for steganalysis of digital images. IEEE Transactions on Information Forensics and Security, 7(3):868-882, June 2011. A feature set implementation is available at http://dde.binghamton.edu/download/feature_extractors/

3.2 Classification

The simplest formulation of the watermark detection problem leads to a binary classification problem—to decide whether the feature vector is extracted from an image containing a readable watermark or not. The idea is to use a machine learning approach, i.e., train a binary classifier on large amount of labeled training samples so that it can well generalize and successfully classify previously unseen samples. There are many available out-of-the-box classifiers in the literature. We investigated Linear Support Vector Machines (L-SVM), Gaussian kernel SVM (G-SVM), logistic regression and simple Fisher Linear Discriminant (FLD).[2] While the performance of G-SVM was indeed superior to the other classifiers, we decided to use only slightly worse logistic regression due to its fast classification and native ability to output probabilities of detection instead of binary decision.

The implementation of choice for logistic regression training is LIB LINEAR library (More information and downloads are available at http://www.csie.ntu.edu.tw/~cjlin/liblinear/) with option '-s 0'. This implementation minimizes the L2 criterion and uses 5-fold cross-validation to find the optimal value of parameter c. Logistic regressor evaluates probability that a given feature vector $f=(f_1, \ldots, f_{169})$ was obtained from a watermarked object as $$p(f) = \frac{1}{1 + e^{-w \cdot f^T}}, \quad w \cdot f^T = \sum_{i=1}^{169} w_i f_i, \quad (2)$$

where $w=(w_1, \ldots, w_{169})$ are weights obtained from training. In our implementation, elements of the feature vectors were normalized to zero mean and unit variance before being used in logistic regressor. Feature element means and variances were determined in training phase and kept constant when testing the detector.

3.3 Training Image Sets

Two image sets were constructed to train logistic regressor to recognize features extracted from marked and unmarked image blocks. Each set consisted of 5000 images obtained from full resolution camera frame by downsampling followed by cropping random 128×128-pixel image block. Each 128×128-pixel image was evaluated by a watermark detector and labeled as marked or unmarked. Image sets were handcrafted to include representative samples of various marked and unmarked objects as well as sensor noise. Two image sets are summarized below.

TABLE 1

Search for optimal values of feature set parameters q (top), T (middle) and D (bottom) as evaluated by the probability of detection error $P_E$. Lower values of $P_E$ result in better feature set. Two parameters are always fixed to default values q = 4, T = 2 and D = 4. Values of parameters T and D determine the dimensionality of the feature set before symmetrization.

| q | 1 | 2 | 3 | 4 | 5 | 6 | 7 | 8 |
|---|---|---|---|---|---|---|---|---|
| $P_E$ | 0.134 | 0.128 | 0.119 | 0.114 | 0.116 | 0.118 | 0.123 | 0.125 |
| T | 1 (dim 25) | | 2 (dim 169) | | 3 (dim 625) | | | |
| $P_E$ | 0.135 | | 0.114 | | 0.116 | | | |
| D | 3 (dim 39) | | 4 (dim 169) | | 5 (dim 819) | | | |
| $P_E$ | 0.139 | | 0.114 | | 0.116 | | | |

Unmarked images (class 0): Image blocks that do not result in watermark detection.
  45% of images of watermarked objects (object too far, watermark too weak or the perspective distortion too strong)
  45% of images of non-watermarked objects
  10% of images with noisy background only
Marked images (class 1): Images blocks with detected watermark.
  100% of images with objects containing readable watermark of various strength 3.4 Optimizing Feature Parameters Feature set described in Section 3.1 has three parameters: the quantization step q, the truncation threshold T and order of the co-occurrence D. Optimal values of these parameters were determined by minimizing probability of error $P_E$. Error of binary classifier based on logistic regressor $P_E$ is defined as $$P_E = \min_{P_{FA}} \frac{1}{2}(P_{FA} + P_{MD}(P_{FA})),$$

where $P_{FA}$ is the probability of false alarm and $P_{MD}$ is the probability of missed detection.

Table 1 presents results of search for optimum parameter values. The authors, Vojtěch Holub and Tomáš Filler, performed exhaustive search over more combinations of parameters and arrived to the same conclusion the optimal feature set parameters for this problem are q=4, T=2 and D=4 resulting in 169-dimensional feature set.

4. From Classification to Localization

Previous section described how to estimate probability of a watermark being present in a given 128×128 image block. Here we use the algorithm as a building block to estimate optimal position of an image block recommended for more detailed watermark detection. Size of the image block used in the training phase was chosen to be compatible with watermark detector. Due to feature vector normalization, learned classifier can be used with image block of a different size. To find the most promising image block for watermark detection, we divide the downsampled image into a grid of non-overlapping 21×21-pixel sub-blocks. Each sub-block is treated as a separate image and the framework described in Section 3 is used to estimate probability of watermark presence. Algorithm 1 is used to pool the estimated probabilities and obtain the list of most promising locations with probabilities grater than parameter $\alpha \geq 0$. Sample result obtained by this algorithm is illustrated in FIG. 2.

Size of the sub-blocks determines statistical significance of the extracted features, number of sub-blocks used to obtain the final neighborhood in the averaging process and the resolution of final coordinates. The size of 21×21 was determined heuristically as the best trade off between these properties.

Figure 5:
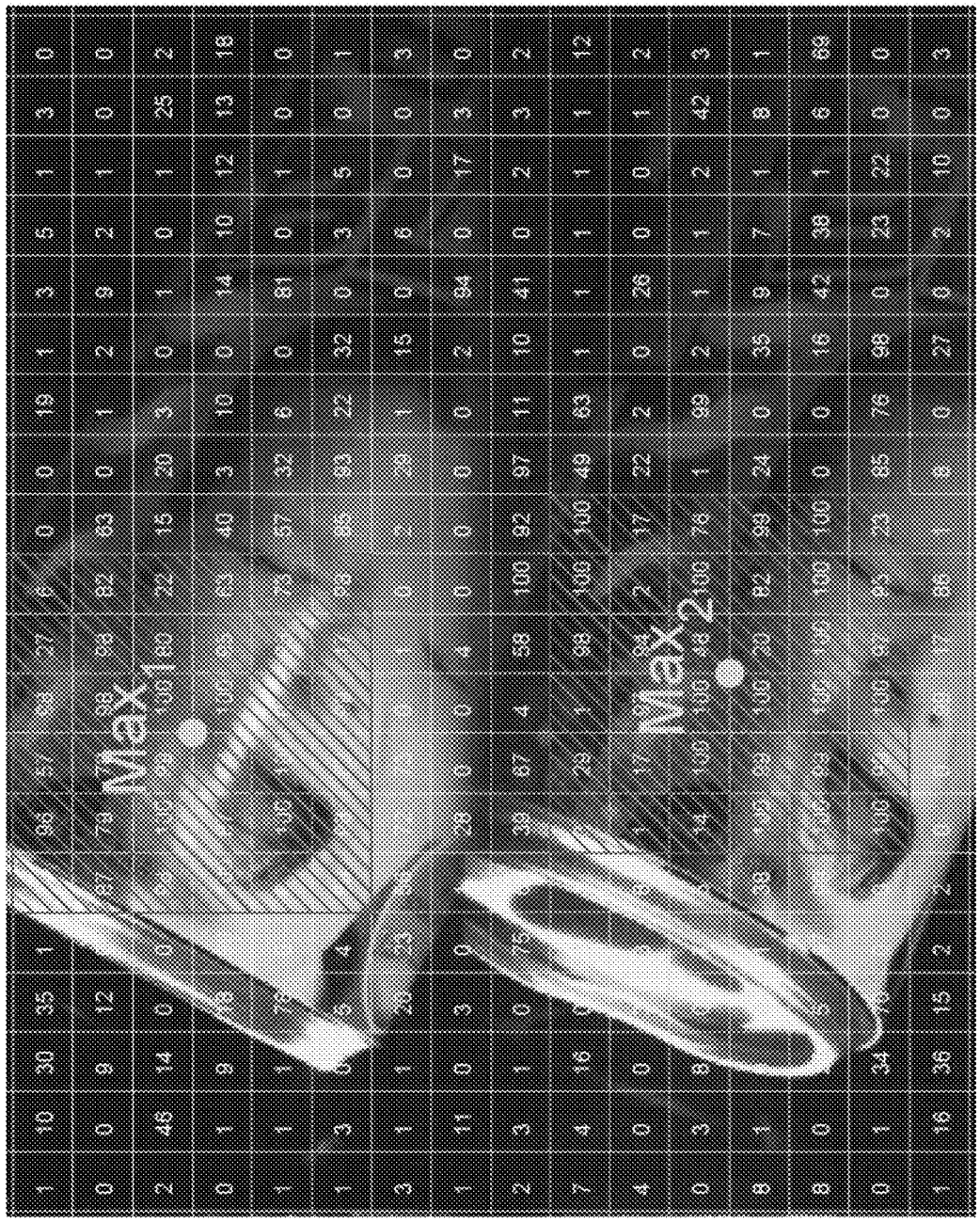
FIG. 5 shows a captured frame of a watermarked package with probability estimates calculated for each non-overlapping sub-block. The two maximums over 6×6 neighborhoods mark the final coordinates for the watermark reader.

Algorithm 1 Pseudo code of sub-block pooling algorithm. Algorithm returns list of image coordinates.

while the number of coordinates in the list is smaller than c do compute neighborhood probabilities P (Ni) by averaging sub-block probabilities with 6×6 sliding window;
find the neighborhood NMAX with largest probability;
if P ($N_{MAX}$)>$\alpha$ then
    add the center of $N_{MAX}$ to the list of coordinates;
else
    break the loop;
end
    set the probabilities in all 36 sub-blocks composing $N_{MAX}$ to zero;
end FIG. 5 shows a captured frame of a watermarked package with probability estimates calculated for each non-overlapping sub-block. The two maximums over 6×6 neighborhoods mark the final coordinates for the watermark reader.

Depending on the application at hand, the number of localized coordinates is driven by two parameters—c and $\alpha$. Parameter c determines the maximum number of output coordinates per image frame, thus, bounding the complexity required to process one frame. Parameter $\alpha$ determines the sensitivity—the higher the $\alpha$ is, the more confident the algorithm is about the watermark presence. For example, when c=2 and $\alpha$=0.5 u to two coordinates are found and recommended for watermark detection when a watermarked object is swiped in front of the camera. No coordinate is recommended for processing when no object is present.

5. Experiments

In this section, we compare robustness of watermark detector using the above proposed approach on real-life checkouts. For this test, we captured a database of 10,000 frames simulating checkout of over 20 different watermarked packages including cans, boxes, and plastic bags. Since the cashier needs time to present an object to the scanner, most of the frames in this database contain just noise and dark background. This database was created independently of the training database and no image was used for training purposes.

We compare the proposed adaptive system with several reference implementations where blocks are statically placed on the frame. The best robustness under current setup we could achieve is when the watermark reader attempt to extract the watermark from all possible 11×15=165 locations. Due to fixed time budget (25 ms for the case of 40 FPS), this may not always be an option in a practical system. From this reason, we also compare our approach with 7 experimentally-designed location that are fixed for each frame. The number of frames with successfully decoded watermark payload is used for comparison.

Figure 6:
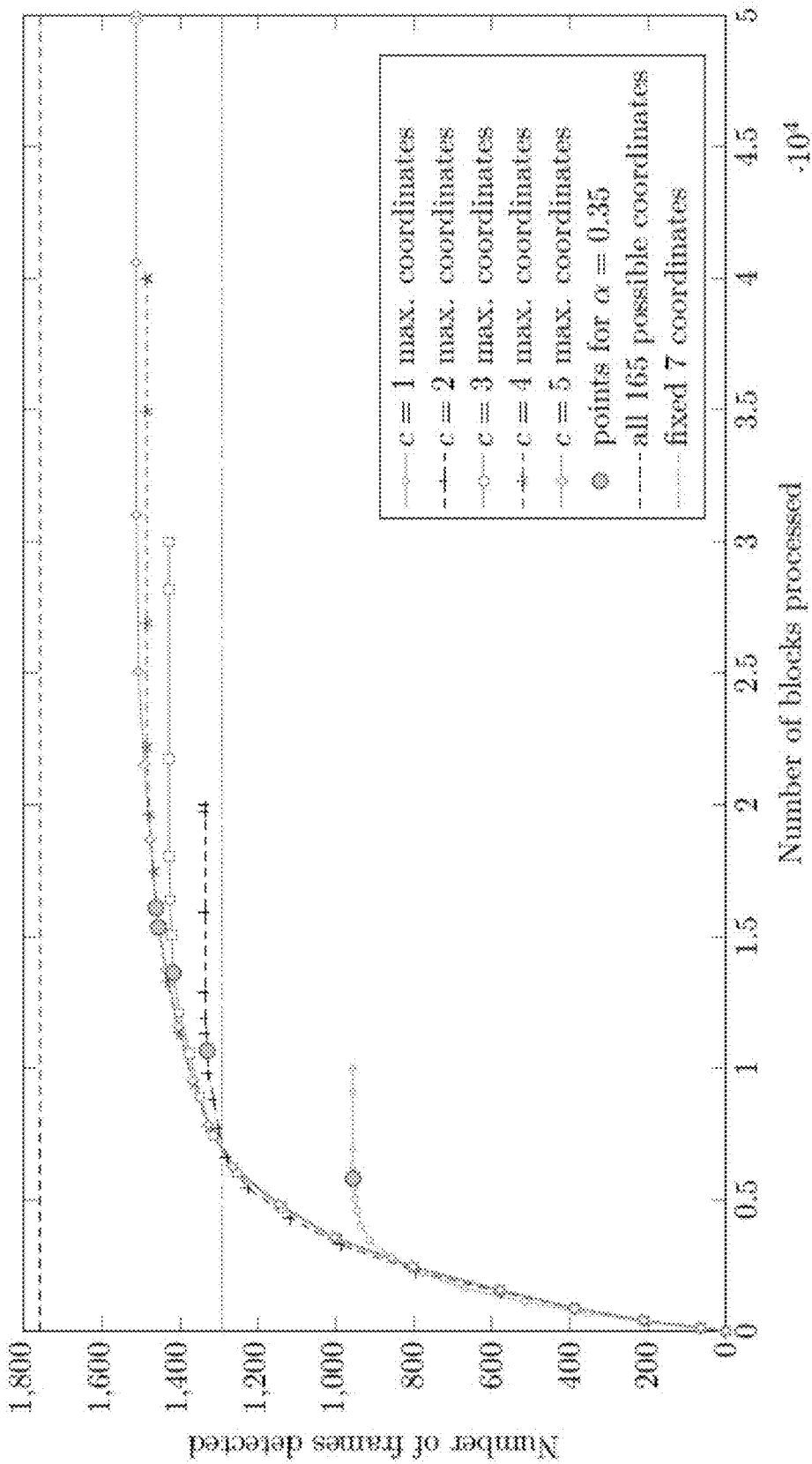
FIG. 6 shows dependency of the number of blocks processed by the watermark reader and the number of frames with successfully extracted watermark on sensitivity parameter α for multiple c.

FIG. 6 shows dependency between number of blocks processed by a watermark detector and number of successfully decoded frames. Several strategies with number of blocks per frame are shown for parameter $\alpha$ between 0 and 1. When $\alpha$=0, all pooled probabilities will be larger than 0 and the localization algorithm will always select c block positions from frame. On the other hand, no location are selected when $\alpha$=1.

Highlighted points in the figure corresponds to points obtained with $\alpha$=0.35. Value $\alpha$=0.35 is considered by the authors as an optimal value since smaller values of $\alpha$ do not provide significant improvement in detections while increasing complexity. Two dashed straight lines show performance of systems with fixed 7 and 165 coordinates. These static systems process 70,000, and 1,650,000 image blocks respectively.

FIG. 6 also shows that system with 7 empirically-determined coordinates can be outperformed even with up to c=2 coordinates per frame resulting in better detection with only 10,500 processed blocks. The number of watermark detections still increases significantly if a higher value of c is used.

Independent on the localization parameters, the whole process of image localization (division into the sub-blocks, feature extraction, classification, finding the best coordinates) takes around 1.5 milliseconds on 2.5 GHz laptop processor when implemented in C++ using the SSE instructions.

6. Conclusion

In this paper we focused on a problem of real-time watermark extraction on computationally constrained devices. In such case, limited amount of processing time is available for watermark detector and thus the whole frame cannot be thoroughly examined by a watermark detector in a given time budget. One of the main contribution of this paper is a machine learning-based framework that is able to localize areas containing watermark with good enough precision significantly faster than running watermark detector. On the example of watermarked consumer packages read by an of-the-shelf barcode imaging scanner, the proposed adaptive approach improved performance over empirically designed detector examining fixed image locations. Proposed approach used approximately one fifth of the computation time. This was achieved in spite of very high noise level in the acquired images.

The key component of the framework are noise sensitive features borrowed from the field of steganalysis which are able to distinguish Digimarc Discover noise-like watermark from other noisy content. These features are classified by a trained logistic regressor that outputs the probability of watermark presence. By evaluating these probabilities from different parts of an image this framework is able to output set of coordinates that are further processed by a watermark reader.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Such documents are incorporated in their entireties, even if cited above in connection with specific of their teachings. These documents disclose technologies and teachings that can be incorporated into the arrangements detailed herein (including the arrangements in Appendix A), and into which the technologies and teachings detailed herein can be incorporated.

The methods, processes, components, apparatus and systems described above, and including those in Appendix A, may be implemented in hardware, software or a combination of hardware and software. For example, the watermark encoding processes and embedders may be implemented in software, firmware, hardware, combinations of software, firmware and hardware, a programmable computer, electronic processing circuitry, processors, parallel processors, and/or by executing software or instructions with processor(s) or circuitry. Similarly, watermark data decoding or decoders may be implemented in software, firmware, hardware, combinations of software, firmware and hardware, a programmable computer, electronic processing circuitry, and/or by executing software or instructions with a multi-purpose electronic processor, parallel processors or multi-core processors, and/or other multi-processor configurations.

The methods and processes described above (e.g., watermark detectors) also may be implemented in software programs (e.g., written in C, C++, Visual Basic, Java, Python, Tcl, Perl, Scheme, Ruby, executable binary files, etc.) stored in memory (e.g., a computer readable medium, such as an electronic, optical or magnetic storage device) and executed by an electronic processor (or electronic processing circuitry, hardware, digital circuit, etc.).

The particular combinations of elements and features in the above-detailed embodiments are exemplary only; the interchanging and substitution of these teachings with other teachings in this and the incorporated-by-reference patents are also contemplated.

What is claimed is:

1. A method comprising:
   obtaining data representing optically captured imagery, the optically captured imagery depicting packaging or a printed label, the packaging or printed label including an encoded signal, the encoded signal including an orientation signal that is detectable in a transform domain;
   generating a feature set of the data representing the optically captured imagery, the feature set representing the optically captured imagery in a spatial domain;
   using a trained classifier to predict the presence of the orientation signal in a transform domain from the feature set in the spatial domain.

2. The method of claim 1 in which said generating comprises calculating difference values between neighboring pixels represented in the data, and quantizing the difference values to yield quantized data.

3. The method of claim 2 in which said generating further comprises rounding the quantized data to the nearest integer to yield rounded data.

4. The method of claim 3 in which said generating further comprises thresholding the rounded data to yield thresholded data.

5. The method of claim 4 in which said generating further comprises accumulating bin-values from the thresholded data.

6. The method of claim 5 in which the feature set comprises a 169-dimensional feature set.

7. The method of claim 1 in which the classifier is trained based on a binary decision of encoded signal present or not.

8. The method of claim 1 in which the classifier is trained based on a non-linear regressor corresponding to orientation signal strength.

9. The method of claim 1 in which the classifier is trained based on a linear regressor corresponding to orientation signal strength.

10. The method of claim 1 in which the encoded signal comprises digital watermarking.

11. An apparatus comprising:
    memory for buffering blocks of image data, the image data having been captured with a camera and depicting product packaging or a printed label;
    one or more processors programmed for:
    generating a spatial domain feature set representation of a block of image data;
    applying a machine-trained classifier to predict from the spatial domain feature set whether the block of image data includes a transform domain encoded signal.

12. The apparatus of claim 11 in which the classifier is trained based on a binary decision of encoded signal present or not.

13. The apparatus of claim 11 in which the classifier is trained based on a non-linear regressor corresponding to encoded signal strength.

14. The apparatus of claim 11 in which the classifier is trained based on a linear regressor corresponding to encoded signal strength.

15. The apparatus of claim 11 in which said generating comprises:
    calculating difference values between neighboring pixels represented in the block of image data, and quantizing the difference values to yield quantized data;
    rounding the quantized data to the nearest integer to yield rounded data;
    thresholding the rounded data to yield thresholded data; and
    accumulating bin-values from the thresholded data.

16. The apparatus of claim 11 in which the encoded signal comprises digital watermarking.

17. The apparatus of claim 16 in which the digital watermarking comprises an orientation component, and in which the feature set comprises a 169-dimensional feature set.

18. The apparatus of claim 11 in which the encoded signal comprises an orientation component, and in which the feature set comprises a 169-dimensional feature set.

19. A non-transitory computer readable medium comprising instructions stored therein, said instructions configure one or more processors for:
    obtaining data representing optically captured imagery, the optically captured imagery depicting packaging or a printed label, the packaging or printed label including an encoded signal, the encoded signal including an orientation signal that is detectable in a transform domain;
    generating a feature set of the data representing the optically captured imagery, the feature set representing the optically captured imagery in a spatial domain;
    using a trained classifier to predict the presence of the orientation signal in a transform domain from the feature set in the spatial domain.

20. The non-transitory computer readable medium of claim 19 in which the generating comprises calculating difference values between neighboring pixels represented in the data, and quantizing the difference values to yield quantized data.

21. The non-transitory computer readable medium of claim 20 in which the generating further comprises rounding the quantized data to the nearest integer to yield rounded data.

22. The non-transitory computer readable medium of claim 21 in which the generating further comprises thresholding the rounded data to yield thresholded data.

23. The non-transitory computer readable medium of claim 22 in which the generating further comprises accumulating bin-values from the thresholded data.

24. The non-transitory computer readable medium of claim 23 in which the feature set comprises a 169-dimensional feature set.

* * * * *